United States Patent
Jackson et al.

[19]

[11] Patent Number: 6,138,883
[45] Date of Patent: Oct. 31, 2000

[54] TRUCK/SPORT UTILITY VEHICLE DIVIDER

[76] Inventors: Danny R. Jackson, 8546 S. Riser Dr., Nineveh, Ind. 46164; Charles Cragen, 5990 State Rd. 44, Martinsville, Ind. 46151

[21] Appl. No.: 09/503,681

[22] Filed: Feb. 14, 2000

Related U.S. Application Data

[63] Continuation of application No. 09/111,192, Jul. 7, 1998, abandoned.

[51] Int. Cl.[7] .................................................. B60R 7/00
[52] U.S. Cl. ........................ 224/404; 224/539; 296/37.6; 410/143
[58] Field of Search .................................. 224/403, 404, 224/405, 539, 542, 925; 296/37.1, 37.5, 37.6, 37.8; 410/129, 143, 151

[56] References Cited

U.S. PATENT DOCUMENTS

| | | | |
|---|---|---|---|
| 3,059,593 | 10/1962 | Mack ....................................... | 410/151 |
| 4,456,415 | 6/1984 | Joice-Cavanagh ....................... | 410/129 |
| 4,722,646 | 2/1988 | McIntyre ................................. | 410/138 |
| 4,946,215 | 8/1990 | Taylor ..................................... | 224/404 |
| 5,265,993 | 11/1993 | Wayne .................................... | 410/129 |
| 5,297,707 | 3/1994 | Weber ..................................... | 224/542 |
| 5,366,124 | 11/1994 | Dearborn, IV .......................... | 224/572 |
| 5,411,355 | 5/1995 | Gosnell et al. .......................... | 410/139 |
| 5,526,972 | 6/1996 | Frazier et al. ........................... | 224/539 |
| 5,588,631 | 12/1996 | Yee .......................................... | 224/404 |
| 5,603,439 | 2/1997 | Pineda ..................................... | 224/403 |
| 5,634,577 | 6/1997 | Pearson, Jr. et al. .................... | 224/403 |
| 5,669,537 | 9/1997 | Saleem et al. ........................... | 224/539 |
| 5,715,978 | 2/1998 | Ackeret .................................. | 224/42.33 |
| 5,769,293 | 6/1998 | Zaretsky .................................. | 224/539 |

FOREIGN PATENT DOCUMENTS 2169877  7/1986  United Kingdom ................... 224/925

*Primary Examiner*—Stephen P. Garbe
*Attorney, Agent, or Firm*—Woodard, Emhardt, Naughton, Moriarty & McNett

[57] ABSTRACT

A partition system for the bed of a utility vehicle includes a divider frame with first and second opposing side edges and a bottom edge. At least one extendible bumper extends from the first opposing side edge of the divider frame. At least one opposing bumper extends from the second opposing side edge, and at least one storage container is mounted to the divider frame. Preferably the divider is in frictional engagement with the sides of the bed of the utility vehicle and includes a plurality of mounted storage containers. In some embodiments, the frictional engagement is achieved with spring biased bumpers, and in other embodiments handle and gear arrangements are used. The divider is removable and may be placed in a predetermined location to act as a mobile storage container. A parallel brace may be used to hold subpanels in place between the divider frame and the brace. Additionally storage containers may be mounted on the removable subpanels.

18 Claims, 9 Drawing Sheets

TRUCK/SPORT UTILITY VEHICLE DIVIDER

This application is a continuation of application Ser. No. 09/111,192 filed on Jul. 7, 1998 now abandoned.

FIELD OF THE INVENTION

The present invention relates generally to partitions and storage containers for the beds of utility vehicles.

BACKGROUND OF THE INVENTION

Many utility vehicles, such as pickup trucks, have open beds in which articles are stored. When articles are left open in these beds, either during driving or while the vehicle is parked, these items are exposed to the weather and/or the possibility of theft or loss. Furthermore, due to the motions while driving, articles tend to shift and scatter in the bed which causes inconvenience in retrieving the articles or can potentially break the articles. For one example, groceries stored near the tailgate of such a utility vehicle are frequently scattered throughout the bed and/or broken by the time the vehicle reaches its destination. Similarly, when small articles are stored, such as tools, nails, fishing lures or the like, these items tend to become mixed or lost and must then be retrieved and sorted. Accordingly, there is a need for protecting articles in the bed of a utility vehicle from exposure or loss and for minimizing the movement of articles within the bed.

One approach to these problems is illustrated in U.S. Pat. No. 5,411,355 to Gosnell, et al. Gosnell illustrates a partition for a bed of a utility vehicle. Gosnell's partition includes latch bars at the top of the partition which engage openings in side rails mounted on the utility bed. Gosnell's partition separates the bed of the utility vehicle but fails to protect items in the bed from exposure, theft or loss and requires the additional installation of side rails with openings. U.S. Pat. No. 4,722,646 to McIntyre illustrates a similar system to Gosnell's with a handle which extends locking pins into mounted side rails.

An alternate design is shown in U.S. Pat. No. 5,526,972 to Frazier, et al. Frazier's design includes a space organizer for truck bed which has a backboard and at least two wing-like partition members, which divide the beds into cells. Frazier additionally suggests that lids may be used to cover partitioned cells of the bed.

Accordingly, there is a need for an improved utility bed divider and storage unit. The present invention addresses these needs.

SUMMARY OF THE INVENTION

A partition system for the bed of a utility vehicle includes a divider frame with first and second opposing side edges and a bottom edge. At least one extendible bumper extends from the first opposing side edge of the divider frame. At least one opposing bumper extends from the second opposing side edge, and at least one storage container is mounted to the divider frame. In one embodiment, the opposing bumper is also extendible.

Preferably the divider frame is in frictional engagement with the sides of the bed of the utility vehicle and includes a plurality of storage containers mounted on the divider frame. In one embodiment, the frictional engagement is achieved with spring biased bumpers. In an alternate embodiment a handle and gear arrangement is used to extend at least one extendible bumper. The partition is removable and may be placed in a predetermined location to act as a mobile storage container.

In one embodiment, a subpanel brace is placed in the vehicle bed parallel to the divider frame. At least one subpanel extends between the divider frame and the subpanel brace. Storage containers may be mounted to the subpanels.

It is an object of this invention to provide an improved partition for the bed of a utility vehicle.

Further objects, features and advantages of the present invention shall become apparent from the detailed drawings and descriptions provided herein.

DESCRIPTION OF THE PREFERRED EMBODIMENTS

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

A divider is provided for the bed of vehicles such as pickup trucks or sport utility vehicles and which provides a number of advantages. For example, when the divider is placed in the bed of a utility vehicle, it serves to keep articles in place and restrain them from moving around the bed during driving. The divider also stores and protects items in mounted storage containers. Furthermore, the divider is easily installed, adjusted and removed without the need for additional equipment or mounting pieces in the bed. Once removed, the divider may be placed in a predetermined location to serve as a mobile storage container.

Figure 1:
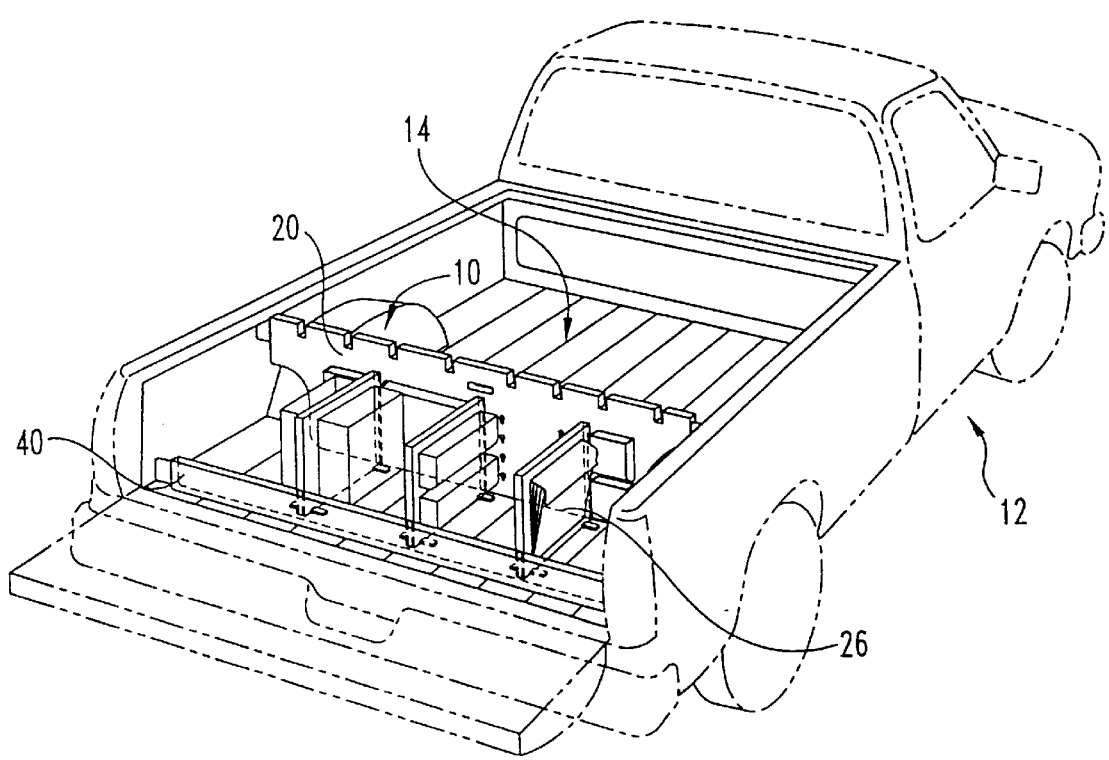
FIG. 1 is a perspective view of a partition system mounted in the bed of a utility vehicle.

As illustrated in FIG. 1, truck 12 has bed 14 into which partition system 10 is placed. Partition system 10 includes divider frame 20 which is frictionally held in place to store articles and to prevent movement of articles in the bed 14. If desired, divider frame 20 defines cut-out portions at the lower sides to accommodate wheel wells which extend into bed 14. Subpanel brace 40 is parallel to divider frame 20 in bed 14. Subpanels 26 are mounted between divider frame 20 and subpanel brace 40 and engage tracks on divider frame 20 and corresponding tracks on subpanel brace 40. Storage containers are mounted on either side of divider frame 20 and subpanels 26. Partition system 10 could alternatively be placed in other vehicles such as in automobile trunks or small boats and the cut-out portions could be omitted or sized differently.

Figure 2:
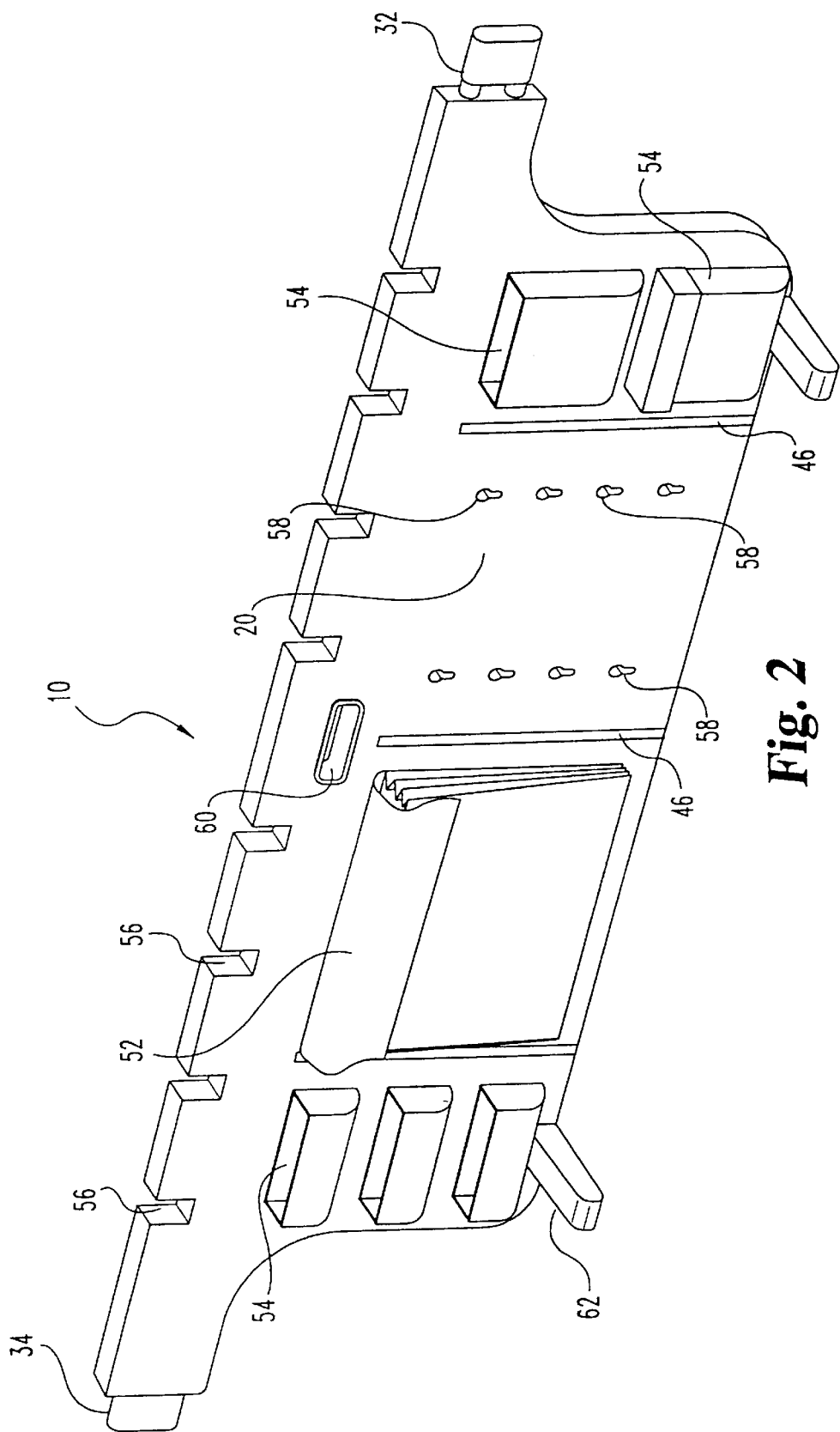
FIG. 2 is a perspective view of the divider frame of FIG. 1.

As further illustrated in FIG. 2, partition system 10 includes divider frame 20 with first and second top bumpers 32 and 34. Storage containers such as pockets 52, trays 54, lockboxes or similar holders are mounted on frame 20 and are secured with pegs, hooks, screws or other means to mounting openings such as mounting openings 58. Divider frame 20 further includes handle 60 for ease in removing and carrying divider frame 20. Optionally, grooves 56 along the top edge of frame 20 may be used for resting and organizing long handled tools or other items within bed 14. In one embodiment (not shown), a safety bar or guard may be mounted along the top edge of frame 20 against grooves 56 and may be locked in place to prevent removal or movement of tools or items in grooves 56. The safety bar could have complimentary grooves to grooves 56.

Feet 62 may be mounted along the bottom edge of frame 20 to maintain frame 20 upright. In one embodiment, feet 62 are retractable via threaded, spring loaded or frictional retractors as will be understood in the art. For example (not shown), feet 62 may be spring mounted on pins to extend, rotate 90 degrees and retract into recesses in the bottom edge of divider frame 20.

Figure 5:
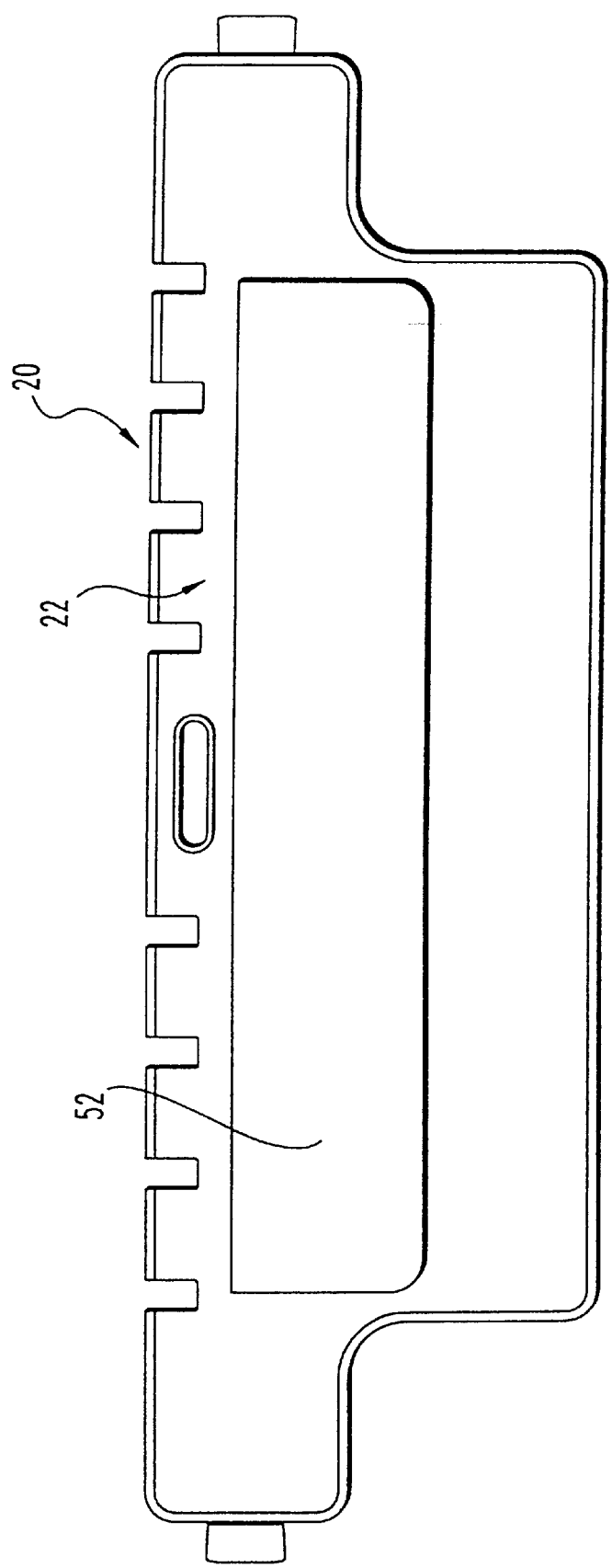
FIG. 5 is a back view of an alternate divider frame.

As shown, first top bumper 32 extends from one top, side edge of frame 20 and second or opposing top bumper 34 extends from the top of the opposing side edge of frame 20. At least one of first top bumper 32 or second top bumper 34 is extendable to extend and retract for ease in placement of divider frame 20 within bed 14. The backside of divider frame 20 includes additional mounting locations 58 to which storage containers may be attached. An alternate configuration is shown in FIG. 5 with backside 22 of divider frame 20 including full pocket 52 which extends the length of divider frame 20.

Figure 3:
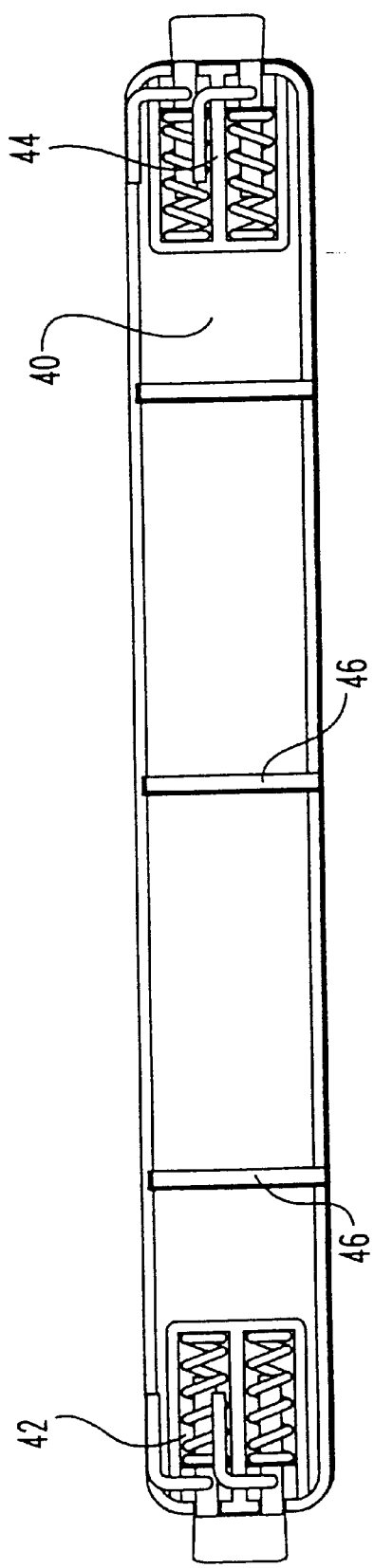
FIG. 3 is a perspective view of the partition system of FIG. 1.

A rear view of subpanel brace 40 is illustrated in FIG. 3. Brace 40 may be placed in bed 14 parallel to divider frame 20 and includes first brace bumper 42 and second brace bumper 44 to keep subpanel brace 40 in place. Preferably, brace 40 is perpendicular to the sidewalls of bed 14. As in divider frame 20, at least one of first brace bumper 42 or second brace bumper 44 is extendable to frictionally engage the sides of the bed. Brace 40 includes subpanel tracks 46.

Figure 4:
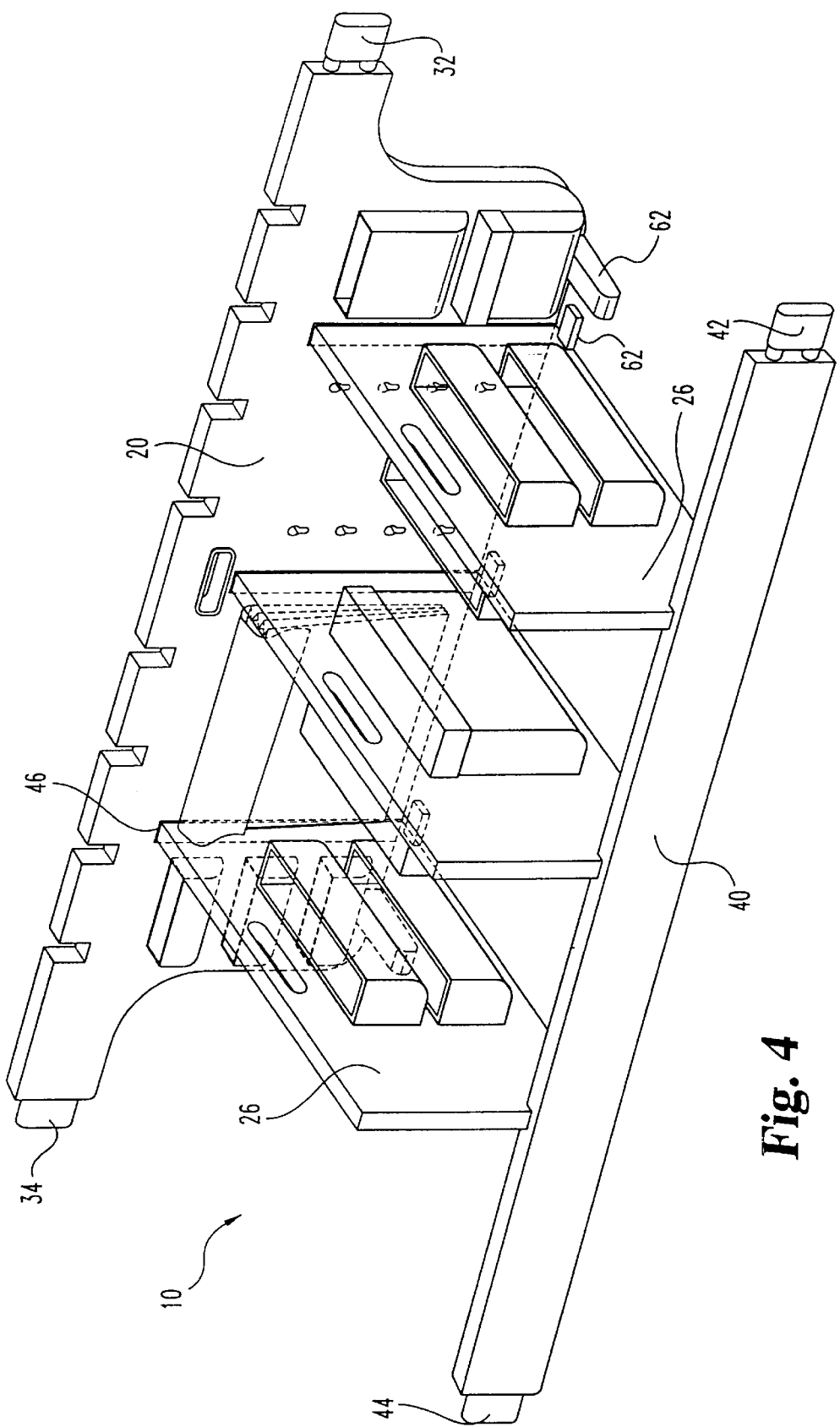
FIG. 4 is a back view of the divider of FIG. 2.

Partition system 10 is shown in FIG. 4 with divider frame 20, subpanel brace 40 and subpanels 26. Each subpanel 26 engages and extends from a track on divider frame 20 to a track on subpanel brace 40. Each subpanel 26 is removable, or may be locked in place with a lock or pin to prevent unauthorized removal. Storage containers such as pockets 52 or trays 54 may be removable mounted to either side of each subpanel 26.

Figure 6:
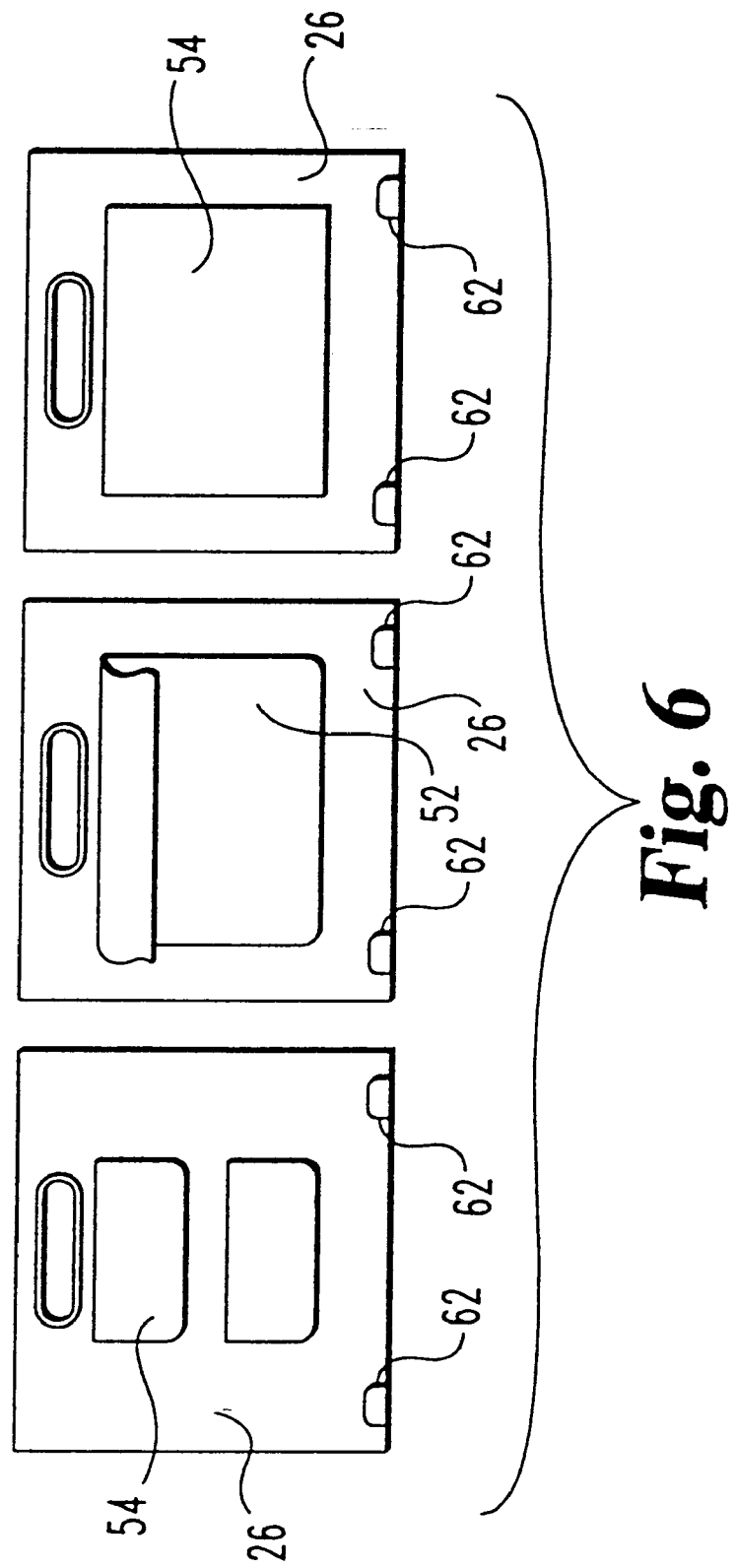
FIG. 6 is a front view of various subpanels according to one embodiment of the invention.

Subpanels 26 are illustrated in alternate configurations in FIG. 6. Pockets 52 or trays 54 are storage containers which may be mounted on either side of removable subpanels 26. For additional protection, lids or covers may be mounted to pockets 52 or trays 54 (FIG. 2). In an alternate embodiment (not shown), trays 54 may include holes or slots through which tools, for example screwdrivers, may be inserted and hung. Feet 62 may be mounted to the bottom edges of each subpanel 26 to independently maintain the subpanel upright.

Figure 7:
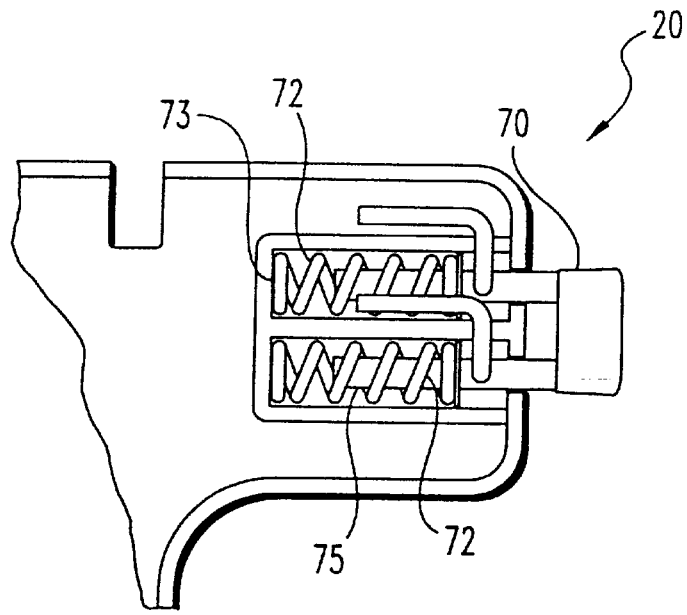
FIG. 7 is an enlarged partial view of an extendable bumper according to one embodiment of the invention.
Figure 7A:
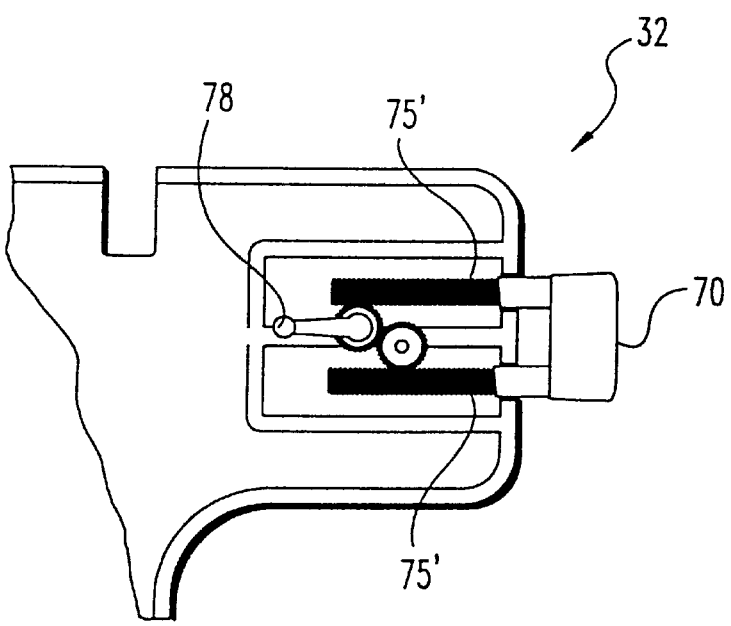
FIG. 7A is an enlarged view of an extendable bumper according to an alternate embodiment of the invention.
Figure 8:
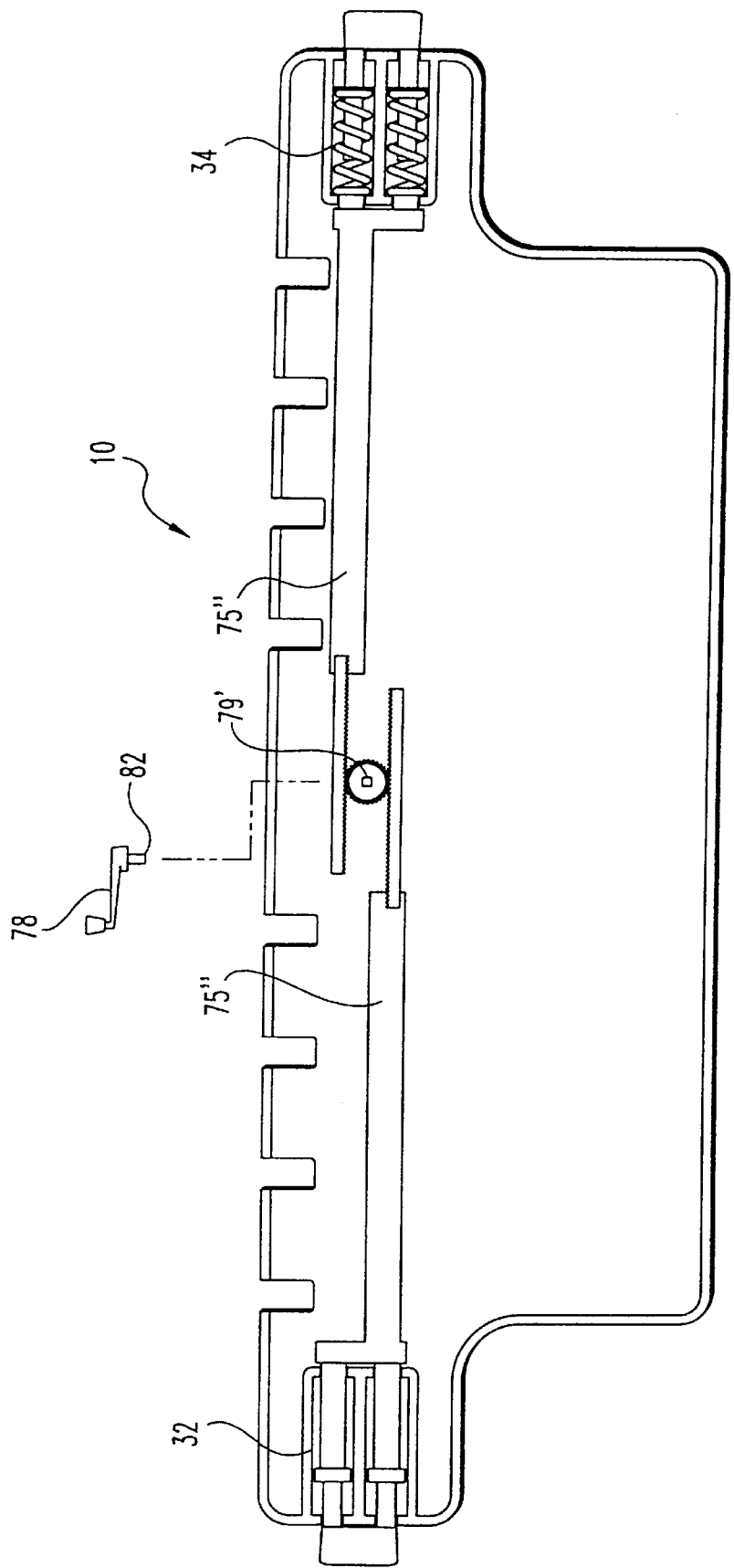
FIG. 8 is a partial view of extendable bumpers according to another embodiment of the present invention.

Illustrated in FIGS. 7, 7A and 8 are alternate extension mechanisms for first top bumper 32. Similar mechanisms may be used on second top bumper 34, first lower bumper 42 or second lower bumper 44. Shown in FIG. 7 is a partial view of first top bumper 32 with cover 70, preferably a rubber boot. Base location 73 is fixed in position on frame 20 with extension shafts 75 extending from the side. Springs 72 are mounted to extension shafts 75 and press against base location 73. Springs 72 are biased to urge shafts 75 and cover 70 away from frame 20. In an alternate embodiment, illustrated in FIG. 7A, extension shafts 75' include threads 76 on the shafts which engage gear set 79 and handle 78. Handle 78 serves as a crank which may be turned to extend extension shafts 75' to extend cover 70.

Another embodiment is shown in FIG. 8 where handle 78 may be used to extend top bumpers 32 and 34 simultaneously, or alternatively brace bumpers 42 and 44 simultaneously. In one alternative shown in FIG. 8, springs may be combined with the gear set extension mechanisms to allow tightening, but to prevent over-tightening of the partition system against the bed sidewalls. Handle 78 includes square key shaft 82 which engages gear set 79'. Gear set 79' engages extension shafts 75" which extend to first and second top bumpers 32 and 34 or similarly to first and second brace bumpers 42 and 44. For added security, handle 78 is removable from gear set 79' and may be carried or stored elsewhere after locking the divider in place. For illustration purposes, gear sets 79 and 79' are illustrated in one manner, other arrangements as understood in the art could also be used.

Figure 9:
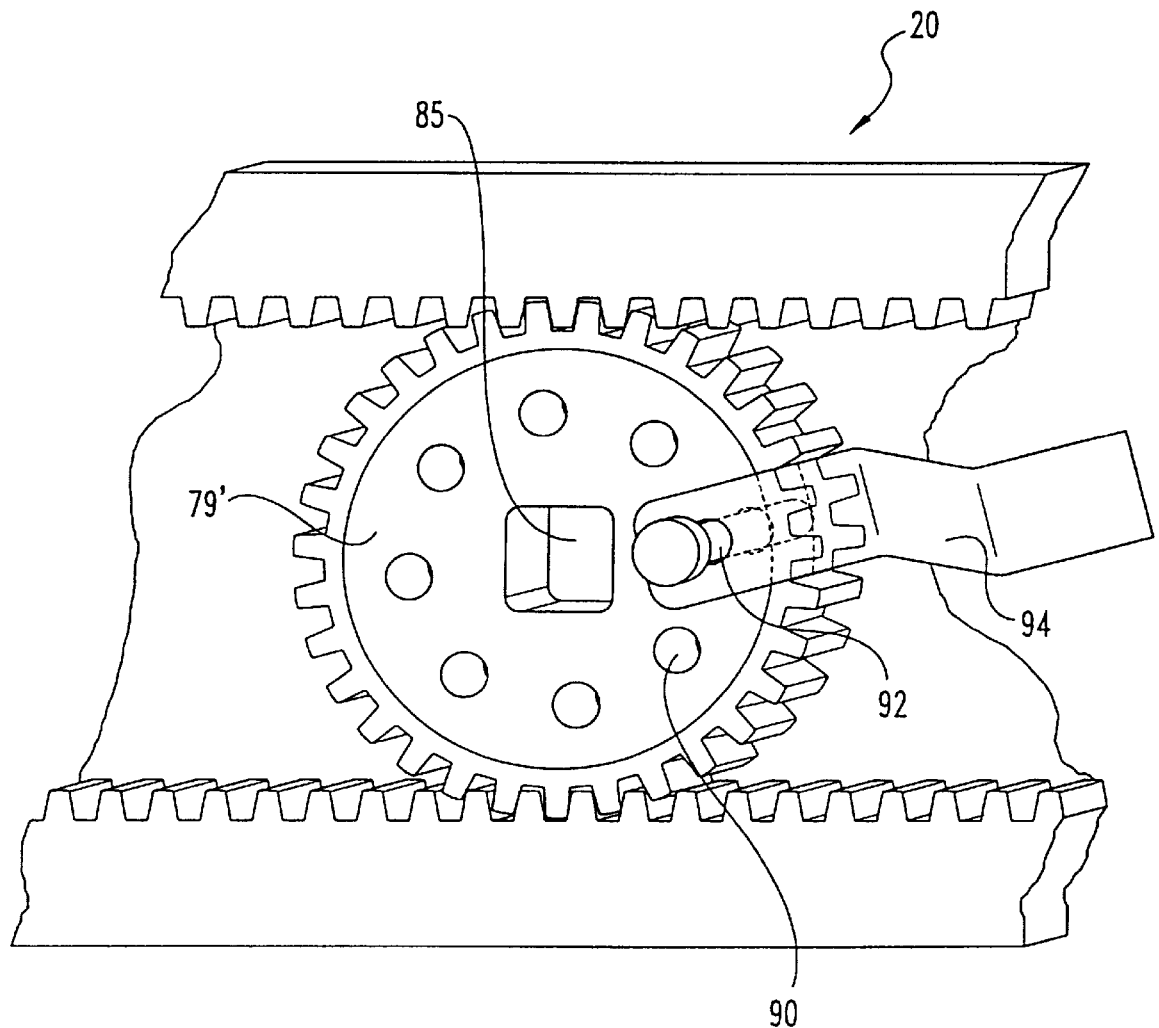
FIG. 9 is a cut-away view of a locking mechanism for an extendable bumper.

Illustrated in FIG. 9 is one retaining system which might be used with gear set 79 or 79'. Leaf spring 94 is mounted on divider frame 20 and includes retaining pin 92. Retaining pin 92 is sized to be placed through a hole in divider frame 20 which aligns with one of retaining holes 90 in gear set 79'. Retaining pin 92 extends outside of divider frame 20 to form a grip. Retaining pin 92 is held away from gear set 79' during adjustment, once gear set 79' engages divider frame 20 in place, retaining pin 92 may be placed in a retaining hole 90 and divider frame 20 and held in place with leaf spring 94. The handle may then be removed from square key hole 85 without gear set 79' retracting. The handle may be replaced and pin 92 removed when retraction is desired. Alternate retaining systems such as ratchets, stops, keys or pins may be used to retain gear set 79' in place as will be understood by those of skill in the art.

In use, partition system 10 is placed in bed 14 of truck 12. In one embodiment, divider frame 20 includes first upper bumper 32 extending from one side edge and second upper bumper 34 on the opposing side edge. At least first upper bumper 32 is extendable and second upper bumper 34 may also be extendable. Once divider frame 20 is in the desired location in bed 14, at least first, extendible upper bumper is extended to frictionally engage the sidewalls of the bed and hold the divider frame in place. For best results, divider frame 20 is perpendicular to the sidewalls of bed 14 and abuts the wheelwells in bed 14. Either before or after positioning divider frame 20, storage compartments such as trays or pockets are mounted to frame 20 on the front and back in various sizes and locations to form a desired configuration, and items may be placed in storage compartments 52 and 54 for protection from movement or the weather.

When desired, the extended bumpers are retracted and frame 20 is removed from vehicle bed 14. Frame 20 can then be placed in a predetermined location to serve as a mobile storage unit where feet 62 hold frame 10 upright. Frame 20 may then be returned to vehicle bed 14 and locked in place as desired.

In one embodiment the bumpers on frame 20 are mounted with springs to bias the bumpers to extend to the sidewalls of the truck bed. In an alternate embodiment, a handle and gears are used to extend the bumpers. These extension mechanisms allow for continuous adjustment against smooth walls and provide frictional engagement to hold the partition in place. Either bumpers on opposing sides can each extend, or at least one bumper on one side extends and presses a non-extendable bumper against the opposing sidewall. Once the partition is positioned, the handle may be removed and stored separately to prevent unauthorized removal of the partition. Similarly, a lock or retaining pin may be used with subpanels 26 to prevent unauthorized removal of the subpanels.

In a further embodiment, partition system 10 includes brace 40 and removable subpanels 26. Subpanel brace 40 is placed in bed 14 parallel to divider frame 20 and includes first and second brace bumpers 42 and 44 where at least one bumper is extendible similar to the bumpers on divider frame 20. Subpanels 26 each are preferably perpendicular to divider frame 20 and bottom brace 40 and extend from tracks on divider frame 20 to tracks on bottom brace 40. Subpanels 26 may be removed by lifting from the tracks and used as mobile storage containers. By way of illustration, three or four subpanels could be placed in tracks, depending on the size of the partition system and vehicle bed.

In an alternate embodiment, subpanels 26 extend from divider frame 20 to brace 40 without the use of tracks. A frictional fit is maintained between the subpanels, divider frame 20 and brace 40 which holds subpanels 26 in place. One method to maintain the fit is, for example, with rubber compression pads mounted on divider frame 20 and brace 40 to engage the edges of subpanels 26 or corresponding pads on subpanels 26. This allows subpanels 26 to be placed without alignment with tracks and the number of subpanels used could vary.

In an illustrated embodiment, divider frame 20 abuts rear of the wheelwells of bed 14 and brace 40 is adjacent the tailgate or rear edge of bed 14. This allows ease of reach for tailgate access over brace 40 to storage containers on frame 20 or subpanels 26. In an alternate embodiment, partition system 10 may be adjacent the front of bed 14 with frame 20 just ahead of the wheelwells and brace 40 adjacent the cab of the vehicle. In a still further embodiment, a second divider frame 20 could be substituted for brace 40, providing still further storage capacity.

In one embodiment frame 20 is formed from one piece of extruded plastic; however, it could alternatively have a modular construction. Similarly, divider frame 20 could be made from aluminum, steel, wood or other durable materials as understood by those of ordinary skill in the art. The storage containers are also preferably formed of plastic, but could also be made from aluminum, steel, cloth, vinyl, wood or other materials. Partition system 10 may be made in sizes and shapes to conform to various bed sizes and designs.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A partition for the bed of a pickup truck, sport utility vehicle, car or small boat comprising:

a substantially vertical divider frame with first and second opposing side edges, a top edge, and a bottom edge and mounting openings;

at least one mechanically extendible and retractable resiliently spring-mounted bumper mounted on said divider frame adjacent to said top edge, extending from said first opposing side edge of said divider frame;

at least one opposing bumper mounted on said divider frame adjacent to said top edge, extending from said second opposing side edge; and, at least one storage container mounted to said mounting openings of said divider frame.

2. The partition of claim 1 wherein said at least one opposing bumper is extendible.

3. The partition of claim 1 further comprising at least one handle and gear set mounted to said divider and engaging said at least one extendible bumper to extend or retract said bumper from said first side edge of said divider.

4. The partition of claim 3 wherein said gear set is lockable to prevent retraction of said at least one extendible bumper.

5. The partition of claim 4 further comprising feet transversely mounted along said bottom edge of said divider frame wherein said feet maintain said divider in an upright position when said spring-mounted bumper is retracted.

6. The partition of claim 5 further comprising a plurality of storage containers mounted to said divider frame.

7. The partition of claim 6 wherein said plurality of storage containers are removably mounted to said divider frame.

8. A partition system for the bed of a pick-up truck, sport utility vehicle car or small boat, comprising:

a vertical divider frame with first and second opposing side edges, and having a divider height;

at least one mechanically extendible and retractable resiliently spring-extended bumper mounted to said divider frame and extending from said first opposing side edge of said divider frame;

at least one opposing bumper extending from said second opposing side edge of said divider frame;

a subpanel brace parallel to said divider frame and having a height less than the divider height;

at least one subpanel extending from said divider frame to said subpanel brace and having mountings openings; and, at least one storage container mounted to said mounting openings of said at least one subpanel.

9. The partition system of claim 8 wherein said at least one opposing bumper is extendible.

10. The partition system of claim 8 further comprising at least one handle and gear set mounted to said divider and engaging said at least one extendible bumper to extend said bumper from said first opposing side edge of said divider frame.

11. The partition system of claim 8 wherein said subpanel brace has opposing side edges having bumpers mounted thereon and wherein at least one bumper from said opposing side edges of said subpanel is resiliently spring-mounted to be mechanically extendible and retractable.

12. The partition system of claim 11 further comprising a plurality of subpanels wherein each of said plurality of subpanels extend from said divider frame to said subpanel brace.

13. The partition system of claim 8 wherein said at least one subpanel is removable.

14. The partition system of claim 13 further comprising feet transversely mounted to said at least one subpanel to maintain said at least one subpanel upright when removed from said divider frame.

15. A method of using a partition system for the bed of a pick-up truck, sport utility vehicle, car or small boat, comprising the steps of:

providing a vehicle bed with opposing bed sides and a bed floor;

placing a divider frame in said vehicle bed, wherein said divider frame is perpendicular to said opposing bed sides and substantially perpendicular to said bed floor, and wherein said divider frame has opposing side edges, mounting openings and a top edge wherein at least one bumpers is mounted to said divider frame on each of said side edges and adjacent said top edge;

mechanically extending at least one resiliently spring-mounted bumper from said opposing side edges of said divider frame to frictionally engage said opposing bed sides; and, mounting storage containers to said mounting openings on said divider frame.

16. The method of claim 15 further comprising the steps of:

placing a subpanel brace in said vehicle bed, wherein said subpanel brace is perpendicular to said opposing bed sides, and wherein said subpanel brace has opposing side edges having bumpers mounted thereon;

extending at least one resiliently spring-mounted bumper from said opposing side edges of said subpanel brace to frictionally engage said opposing bed sides;

placing subpanels in said vehicle bed, wherein said subpanels extend from said divider frame to said subpanel brace; and, mounting storage containers on said subpanels.

17. The method of claim 16 further comprising the steps of:

removing at least one of said subpanels from said vehicle bed; and, placing said subpanel in a predetermined location disengaged from said divider frame, wherein said subpanel includes feet transversely mounted to said subpanel which maintain said subpanel upright.

18. The method of claim 15 further comprising the steps of:

retracting said at least one extended bumper;

removing said divider frame from said vehicle bed; and, placing said divider frame in a predetermined location away from the bed, wherein said divider frame includes feet transversely mounted along the lower edge of said divider frame which maintain said divider frame upright.

* * * * *